United States Patent
Wakamatsu et al.

[11] Patent Number: 5,918,940
[45] Date of Patent: Jul. 6, 1999

[54] SEAT HAVING AN ADJUSTING MECHANISM FOR ADJUSTING HEIGHT OF HEAD REST

[75] Inventors: Fumio Wakamatsu, Okazaki; Nobuhiko Takeda, Nukata-gun; Hideo Nihonmatsu, Chiryu; Satoshi Kawaguchi, Toyota, all of Japan

[73] Assignee: Aisin Seiki Kabushiki Kaisha, Japan

[21] Appl. No.: 08/882,165

[22] Filed: Jun. 25, 1997

[30] Foreign Application Priority Data

Jun. 26, 1996 [JP] Japan ................................. 8-166370
Dec. 17, 1996 [JP] Japan ................................. 8-337196

[51] Int. Cl.⁶ .................................................. A47C 1/10
[52] U.S. Cl. ...................... 297/410; 297/61; 297/378.12
[58] Field of Search .................... 297/410, 403, 297/408, 61, 378.1

[56] References Cited

U.S. PATENT DOCUMENTS

| | | | |
|---|---|---|---|
| 2,947,347 | 8/1960 | Spound | 297/410 X |
| 2,989,341 | 6/1961 | Schliephacke | 297/61 |
| 4,082,354 | 4/1978 | Renner et al. | 297/410 |
| 5,681,079 | 10/1997 | Robinson | 297/378.12 X |
| 5,738,411 | 4/1998 | Sutton et al. | 297/408 X |

FOREIGN PATENT DOCUMENTS

| | | | |
|---|---|---|---|
| 3306188 | 8/1984 | Germany | 297/410 |
| 3512648 | 10/1986 | Germany . | |
| 3718126 | 12/1988 | Germany . | |
| 3843616 | 6/1990 | Germany . | |
| 4219941 | 12/1993 | Germany . | |
| 4319120 | 12/1994 | Germany . | |
| 19513705 | 10/1996 | Germany . | |
| 19603911 | 8/1997 | Germany . | |
| 9-226425 | 9/1997 | Germany . | |
| 7-34761 | 8/1995 | Japan . | |

OTHER PUBLICATIONS

Official Letter from German Patent Office dated Jun. 22, 1998 (3 pages).
English translation of Official Letter (2 pages).

*Primary Examiner*—Laurie K. Cranmer
*Attorney, Agent, or Firm*—Finnegan, Henderson, Farabow, Garrett & Dunner

[57] ABSTRACT

A seat having an adjusting mechanism for adjusting the height of a head rest includes a seat cushion, a seat back connected to the seat cushion and rotatable relative to the seat cushion, a head rest disposed on the seat back and movable in the vertical direction relative to the seat back, and a mechanism for moving the head rest in the vertical direction according to the pivoting of the seat back relative to the seat cushion.

10 Claims, 8 Drawing Sheets

SEAT HAVING AN ADJUSTING MECHANISM FOR ADJUSTING HEIGHT OF HEAD REST

BACKGROUND OF THE INVENTION

1. Field of the Invention

This invention relates to a seat with an adjusting mechanism for adjusting the height of a head rest.

2. Description of the Related Art

A conventional seat with an adjusting mechanism for adjusting the height of a head rest is disclosed in Japanese Utility Model No. 7(1995)-34761. This seat comprises a seat cushion, a seat back rotatably connected to the seat cushion, a head rest disposed on the seat back so as to be able to move in the vertical direction, lower rails attached to the vehicle floor, upper rails movably disposed on the lower rails and which supports the seat cushion, a seat slide mechanism for sliding the upper rails in the longitudinal direction relative to the lower rails, a raising and lowering mechanism for raising and lowering the head rest relative to the seat back, and an interlock mechanism for interlocking the seat slide mechanism and the raising and lowering mechanism.

In accordance with the prior art, the interlock mechanism for interlocking the seat slide mechanism and the raising and lowering mechanism includes a first connecting member formed with an elastic member for forcing the head rest in the upper direction and a wire which is engaged with the head rest and extending in the lower direction. This interlock mechanism further includes a first pulley connected to one end of the wire of the first connecting member for winding the wire, a first gear rotating with the first pulley, a second gear meshed with the first gear so as to reduce the rotational speed, a second pulley rotating with the second gear, a second connecting member including a wire of which one end is connected to the second pulley for winding the wire and the other end is connected to the vehicle floor.

In accordance with this construction, when the seat cushion slides in the forward direction, the wire of the second connecting member is pulled in the downward direction so as to lower the head rest against the elastic force of the elastic member through the second pulley, the second gear, the first gear, the first pulley and the wire of the first connecting member. When the seat cushion slides in the rearward direction, the wire of the second connecting member slackens and the head rest rises by the elastic force of the elastic member.

SUMMARY OF THE PRESENT INVENTION

In accordance with the prior art, the raising and lowering mechanism for raising and lowering the head rest relative to the seat back is not interlocked with the tilting or pivoting movement of the seat back relative to the seat cushion.

It is an object of the present invention to provide a seat with an adjusting mechanism for adjusting the height of a head rest by which the head rest is raised and lowered in response to the tilting or pivoting movement of a seat back relative to a seat cushion.

It is another object of the present invention to provide a seat with an adjusting mechanism for adjusting the height of a head rest which is low in manufacturing cost.

It is a further object of the present invention to provide a seat with a durable adjusting mechanism for adjusting the height of a head rest which is simple in structure and small in size.

It is a further object of the present invention to provide a seat device with a durable adjusting mechanism for adjusting a height of a head rest.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the above mentioned objects and in accordance with the purpose of the invention, as embodied and broadly described herein, the seat of this invention has an adjustable head rest and comprises a seat cushion, a seat back connected to the seat cushion and rotatable relative to the seat cushion, a head rest disposed adjacent the top of the seat back and movable relative to the seat back, and apparatus for moving the head rest towards and away from the top of the seat back in response to rotation of the seat back relative to the seat cushion.

BRIEF DESCRIPTION OF THE DRAWINGS

The features, objects, and advantages of a seat having an adjusting mechanism for adjusting the height of a head rest according to the present invention will be more clearly appreciated from the following description in conjunction with the accompanying drawings wherein.

DETAILED DESCRIPTION OF PREFERRED EMBODIMENTS OF THE INVENTION

A seat having an adjusting mechanism for adjusting the height of a head rest, constructed in accordance with the first embodiment of the present invention, will be first described hereinafter.

Figure 1:
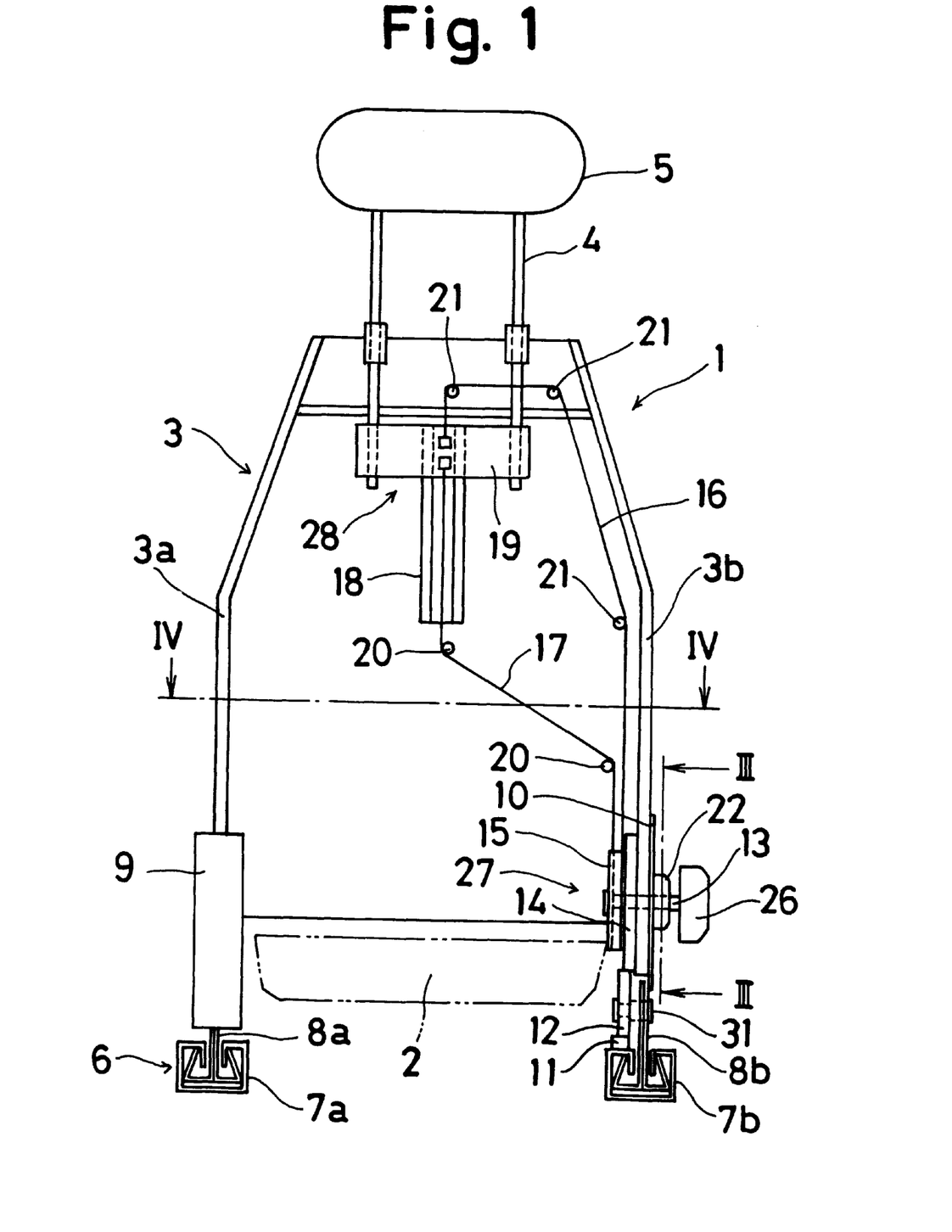
FIG. 1 is a front view of a seat having an adjusting mechanism for adjusting the height of a head rest constructed in accordance with the first embodiment of the present invention.
Figure 2:
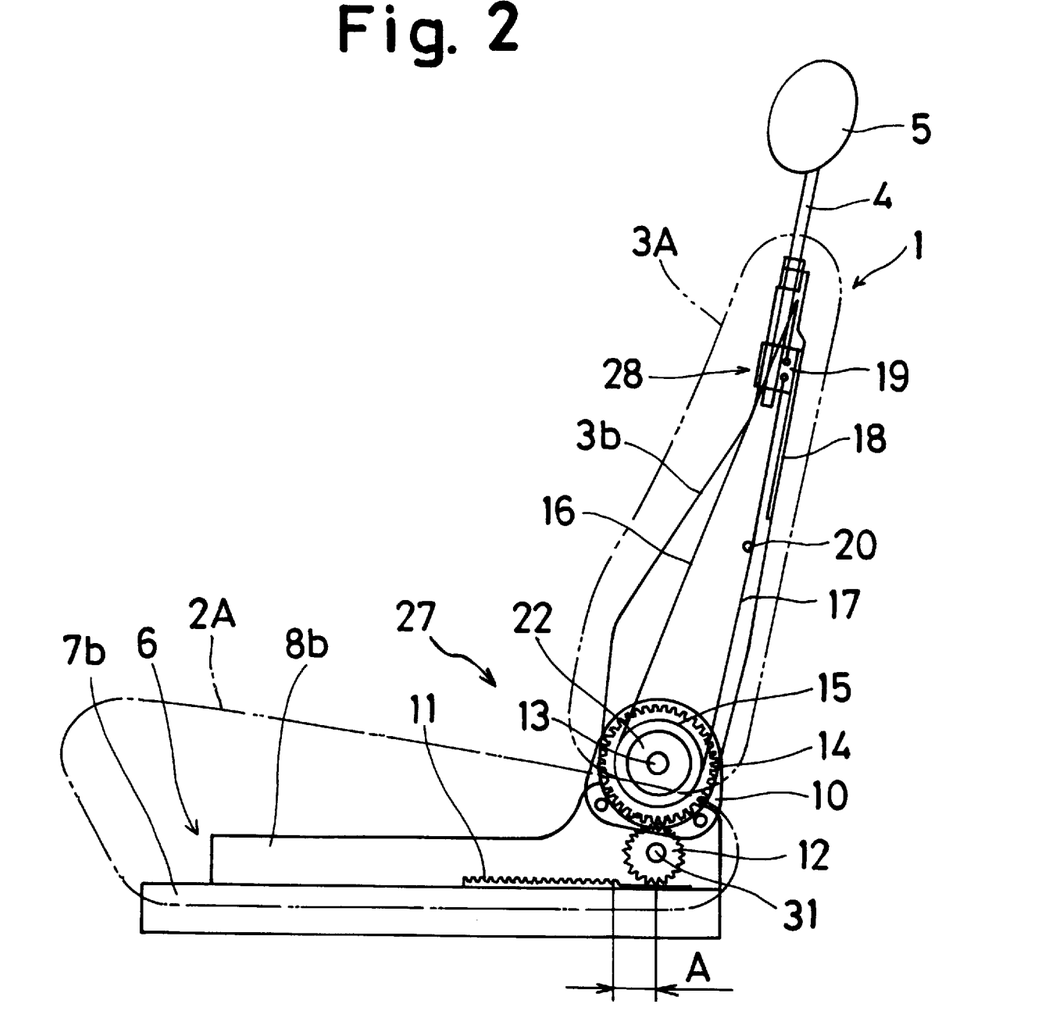
FIG. 2 is a side view of the first embodiment of the seat shown in FIG. 1.
Figure 6:
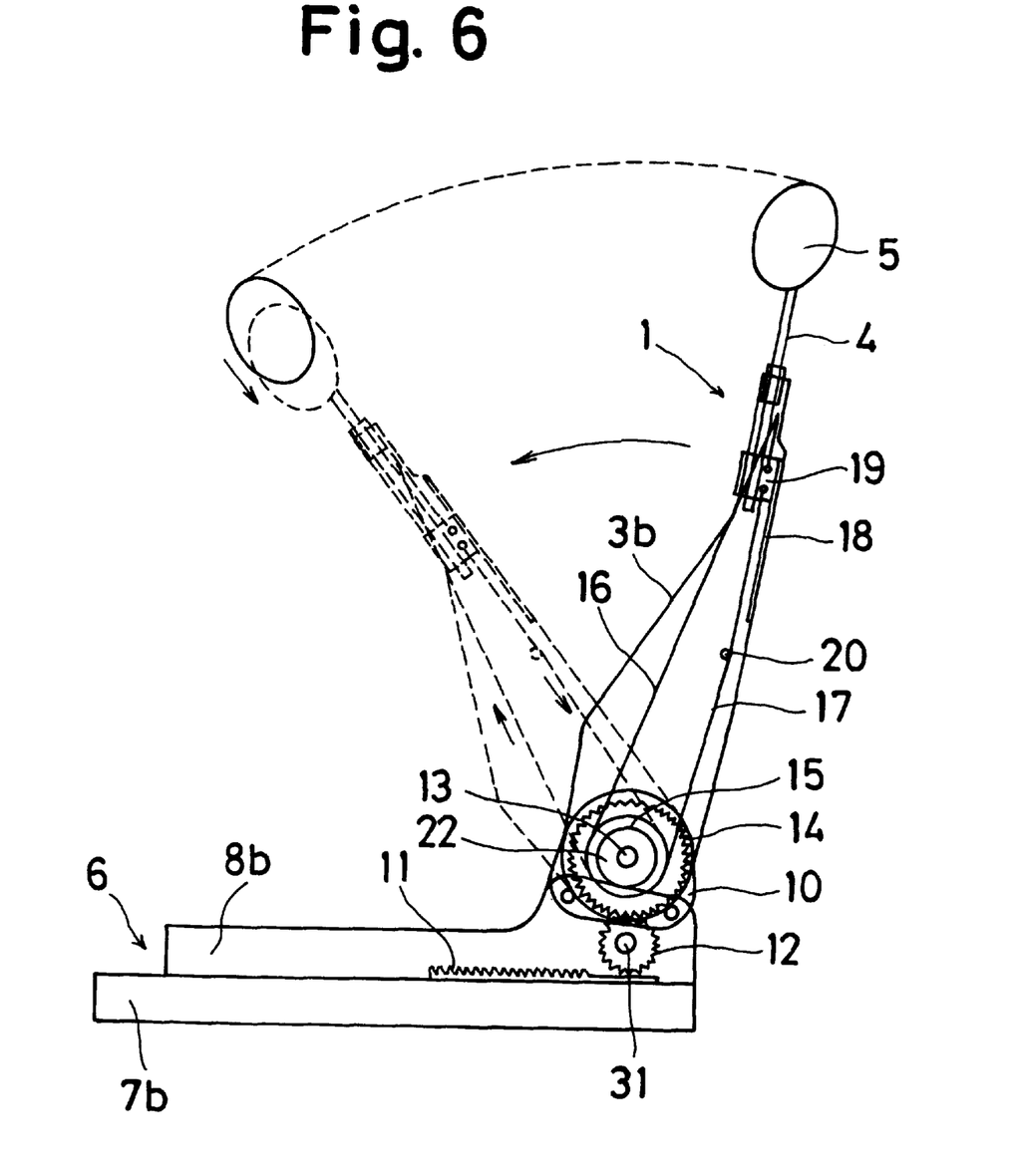
FIG. 6 is a side view showing the operation of the seat shown in FIG. 5 when the seat back is inclined or pivoted in the forward direction relative to the seat cushion.

As shown in FIGS. 1, 2 and 6, seat 1 comprises a cushion pan 2 containing a seat cushion 2A (shown in FIG. 2), a seat back frame 3 containing a seat back 3A (shown in FIG. 2) and a head rest 5 including stays 4 disposed adjacent the top of the seat back 3A. The seat 1 is designed to be fixed to a vehicle floor (not shown) through a seat slide mechanism 6 for sliding the seat 1, forwards and backwards in the longitudinal direction of the seat 1.

The seat sliding mechanism 6 includes a pair of lower rails 7a, 7b and a pair of upper rails 8a, 8b slidably supported on the lower rails 7a, 7b, respectively. The lower rails 7a, 7b are fixed to the vehicle floor a predetermined distance from each other and extend in the longitudinal direction (the horizontal direction shown in FIG. 2).

The cushion pan 2 is preferably fixed to the upper rails 8a, 8b at the ends thereof so as to be disposed between the upper rails 8a, 8b. The seat back frame 3 is preferably disposed between the upper rails 8a, 8b. A pair of shafts 13, 13 (one of them shown in FIG. 1) are rotatably mounted on a pair of lower arms 10, 10 respectively and are aligned concentric to each other. The lower arms 10, 10 are connected to rear portions of the respective upper rails 8a, 8b. A pair of post portions 3a, 3b of the seat back frame 3 are rotatably connected to the lower arms 10, 10 through the rotation shafts 13, 13 respectively. Rotation shafts 13, 13 thus support the seat back frame 3.

In accordance with the above construction, the seat back 3A is disposed at the rear portion of the seat cushion 2A so as to be able to be pivoted to an angle of incline relative to the seat cushion 2A.

A head rest 5 is supported on the upper portion of the seat back frame 3 through a pair of stays 4, 4 so as to be able to be moved towards and away from the top of the seat back 3A. Therefore, the head rest 5 can be moved in the vertical direction relative to the seat back 3A.

Because seat back frame 3 is connected to the upper rails 8a, 8b on which the cushion pan 2 and the head rest 5 are also supported, the seat 1 can be moved in the longitudinal direction relative to the vehicle floor by the sliding movement of the upper rails 8a, 8b relative to the lower rails 7a, 7b. A conventional reclining unit 9 is disposed around the rotation shaft 13 that supports the seat back frame 3 on the upper rail 8a so as to limit the rotation of the seat back frame 3 in order to adjust the angle of inclination of the seat back 3A relative to the seat cushion 2A.

A moving member 19 is slidably disposed in a guide rail 18 which is fixed at a center portion of the seat back frame 3. The moving member 19 is connected to the stays 4, 4 of the head rest 5. The guide rail 18 and the moving member 19 form a vertical moving mechanism 28 of the head rest 5.

A rack gear 11 which extends in the longitudinal direction is fixed to the lower rail 7b. A pinion gear 12 which is meshed with the rack gear 11 is rotatably mounted on the upper rail 8b through a pin 31.

A first gear 14 and a drum 15 are supported on the rotation shaft 13 at the upper rail 8b so that the first gear 14 and the drum 15 rotate together. The first gear 14 is meshed with the pinion gear 12. Further, wires 16, 17 are wound around the drum 15 in the opposite direction to each other at their respective first ends. The rack gear 11, the pinion gear 12, the first gear 14, the drum 15 and wires 16, 17 form an interlock mechanism 27.

A plurality of pulleys 20, 21 are rotatably disposed on the seat back frame 3. The other end of the wire 17 is connected to a lower part of the moving member 19, and wire 17 is engaged with the pulleys 20. Further, the other end of the wire 16 is connected to an upper part of the moving member 19, and wire 16 is engaged with the pulleys 21.

Figure 5:
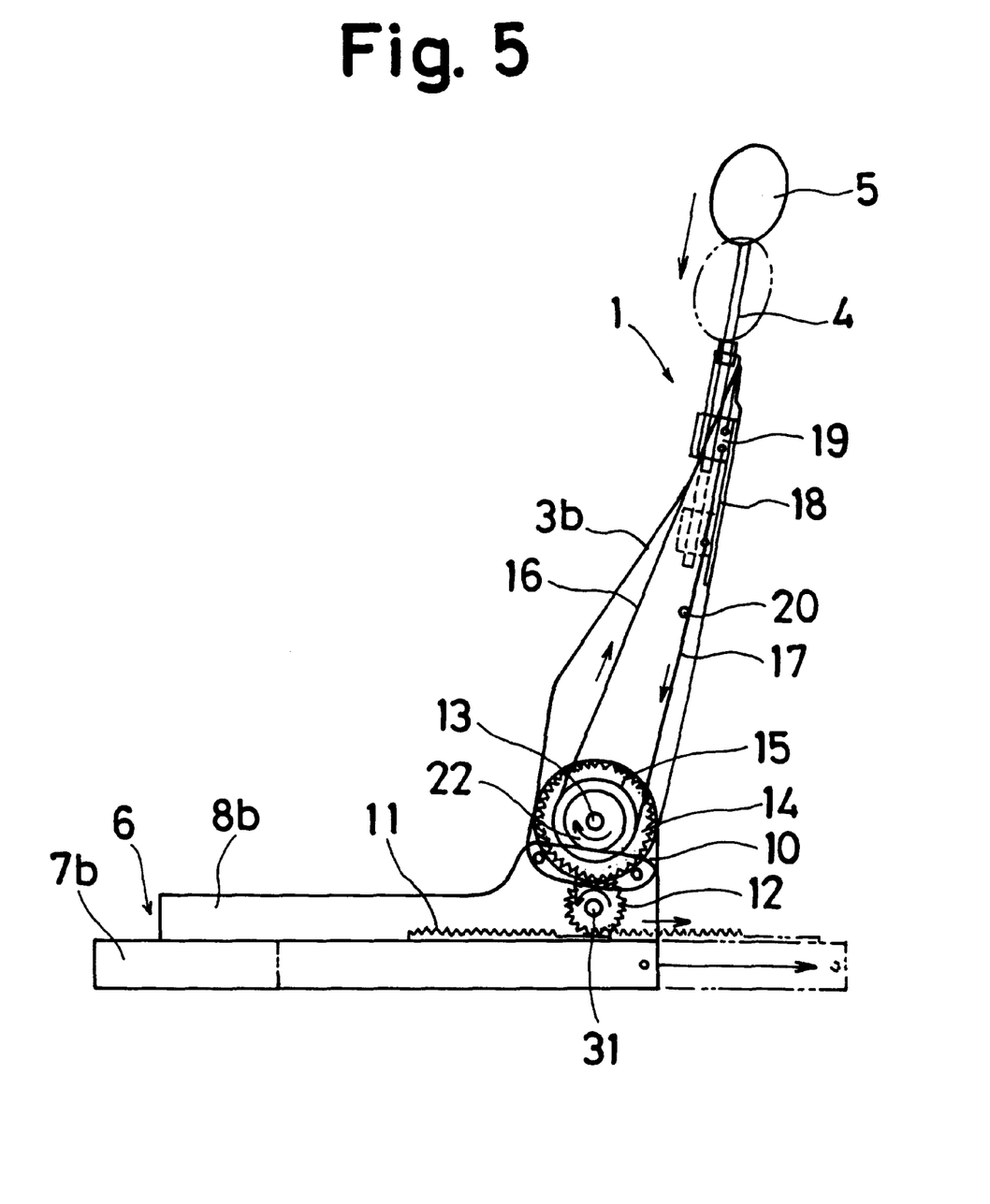
FIG. 5 is a side view showing the operation of the seat of the first embodiment of the present invention.

As shown in FIG. 5, when the upper rails 8a, 8b are slid in the forward direction relative to the lower rails 7a, 7b in order to move the seat 1 in the forward direction by manual operation, electric motor, etc., pinion gear 12 also moves in the forward direction relative to the rack gear 11 (as shown in FIG. 5 by broken lines) so as to rotate the pinion gear 12 and thereby the first gear 14 which is meshed with the pinion gear 12. The drum 15 rotates with the first gear 14 so that the wire 16 is let out by the drum 15 and the wire 17 is wound by the drum 15. Consequently, the moving member 19 and the attached stays 4 are caused to slide in the downward direction along the guide rail 18, and the head rest 5 is lowered, as shown in FIG. 5 in broken lines.

To the contrary, when the upper rails 8a, 8b are now caused to slide in the rearward direction relative to the lower rails 7a, 7b in order to move the seat 1 in the rearward direction, the pinion gear 12, the first gear 14 and the drum 15 are each rotated in a direction opposite to that of the above description. Therefore, the wire 17 is let out by the drum 15 and the wire 16 is wound by the drum 15. Consequently, the moving member 19 is caused to slide in the upward direction along the guide rail 18, and the head rest 5 along with the stays 4 are raised. As described, the head rest 5 is vertically moved according to the direction of longitudinal sliding movement of the seat 1.

Figure 3:
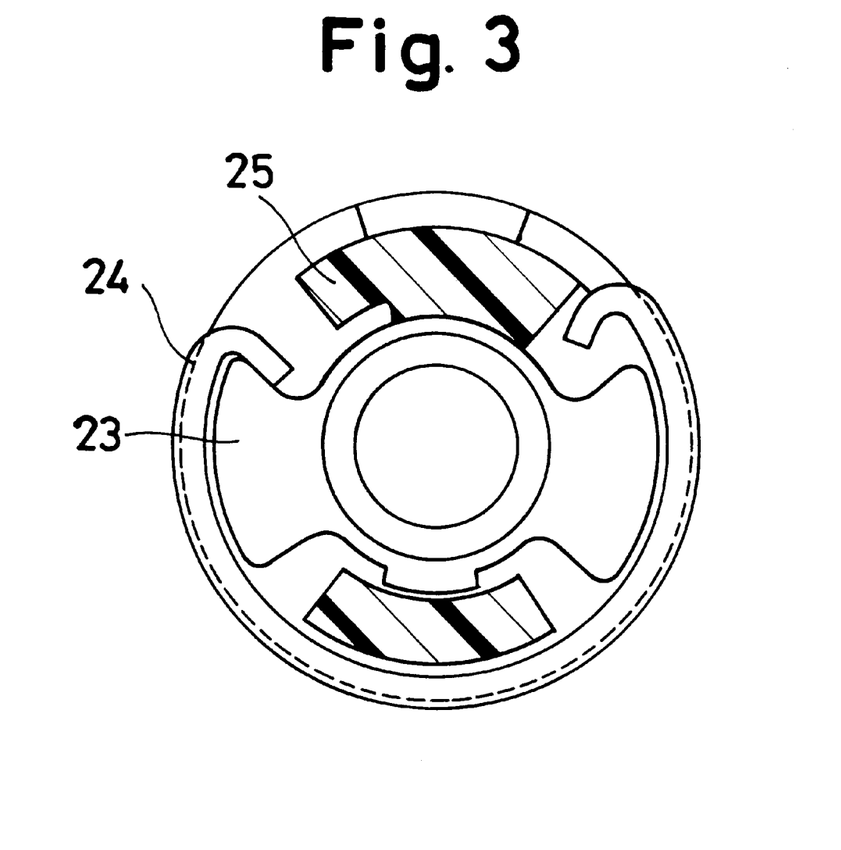
FIG. 3 is a sectional view taken on line III—III of FIG. 1.
Figure 4:
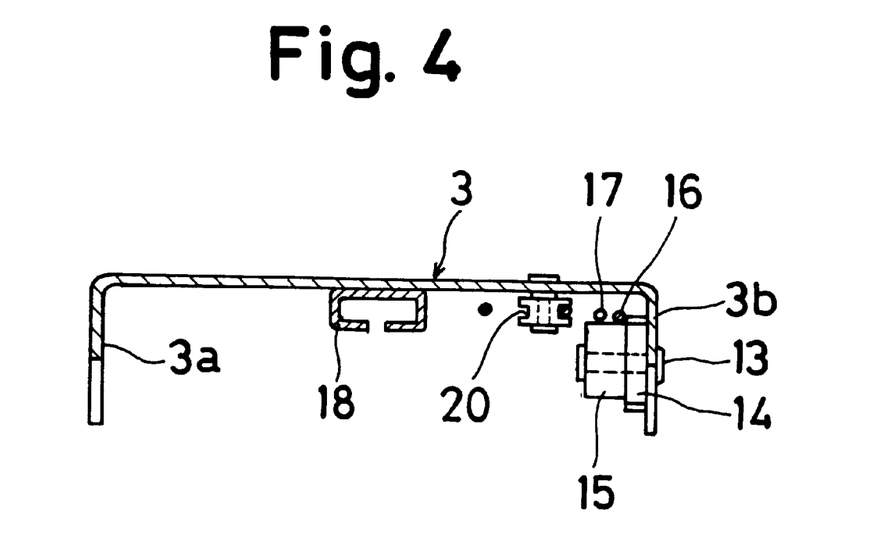
FIG. 4 is a sectional view taken on line IV—IV of FIG. 1.

The rotation shaft 13 at the upper rail 8b is connected to a knob 26 through a reverse prohibition mechanism 22 (i.e., spring coupler). As shown in FIG. 3, the reverse prohibition mechanism 22 is formed with a shaft piece member 23 connected to the knob 26, a drum arm member 25 connected to the shaft 13 and a spring 24 disposed between the shaft piece member 23 and the drum arm member 25.

The shaft piece member 23 is rotated by operation of the knob 26. Since the shaft piece member 23 biases the spring 24 so as to shorten the diameter of the spring 24, the outer circumferential portion of the spring 24 is not in contact with a case (not shown) of the reverse prohibition mechanism 22. Therefore, the spring 24 is rotated by the shaft piece member 23, so as to rotate the drum arm member 25.

To the contrary, if the drum arm member 25 is rotated by the rotation of the drum 15, because the drum arm member 25 biases the spring 24 so as to enlarge the diameter of the spring 24, the outer circumferential portion of the spring 24 is in contact with the case (not shown) of the reverse prohibition mechanism 22. Therefore, the spring 24 does not rotate with the drum arm member 25, and the shaft piece member 23 and the knob 26 do not rotate. Consequently, transmission of rotation from the drum 15 to the knob 26 is prohibited.

The rack gear 11 includes a range A which has no teeth and which is not meshed with the pinion gear 12 (as shown in FIG. 2). When the pinion gear 12 is not meshed with the rack gear 11 (i.e., when the pinion gear 12 is within the range A), the operation of the knob 26 rotates the drum 15 through the reverse prohibition mechanism 22. At this time, the pinion gear 12 and the first gear 14 are rotated independently of the rack gear 11.

When the drum 15 is rotated by the operation of the knob 26 in the clockwise direction in FIG. 2, the wire 17 is wound by the drum 15 and the wire 16 is let out by the drum 15. Therefore, the head rest 5 is lowered in the same manner by movement of the wires when it is lowered by sliding movement of the seat 1 in the forward direction. To the contrary, when the drum 15 is rotated by the operation of the knob 26 in the counterclockwise direction in FIG. 2, the wire 16 is wound by the drum 15 and the wire 17 is let out by the drum 15. Therefore, the head rest 5 is raised in the same manner as when the seat 1 slides in the rear direction.

As described above, the head rest 5 can be vertically moved without sliding movement of the seat 1. Further, since the drum 15 is connected to the reverse prohibition mechanism 22, the head rest 5 cannot be lowered when the pinion gear 12 is not meshed with the rack gear 11 (when the pinion gear 12 is within the range A).

As shown in FIG. 1, the axis of rotation of the first gear 14 and the drum 15 is concentric with the axis of rotation of the reclining unit 9 (corresponding to the axis of the rotation of the seat back 3A). When the seat back 3A is inclined or pivoted forward by operation of the reclining unit 9, the drum 15 simultaneously winds the wire 17 and lets out the wire 16, and the head rest 5 is lowered an amount corresponding to the angle that the seat back is inclined.

A construction of the second embodiment of the invention will be described hereinafter. The same elements are provided with the same numerals, and a description of the elements are omitted.

Figure 7:
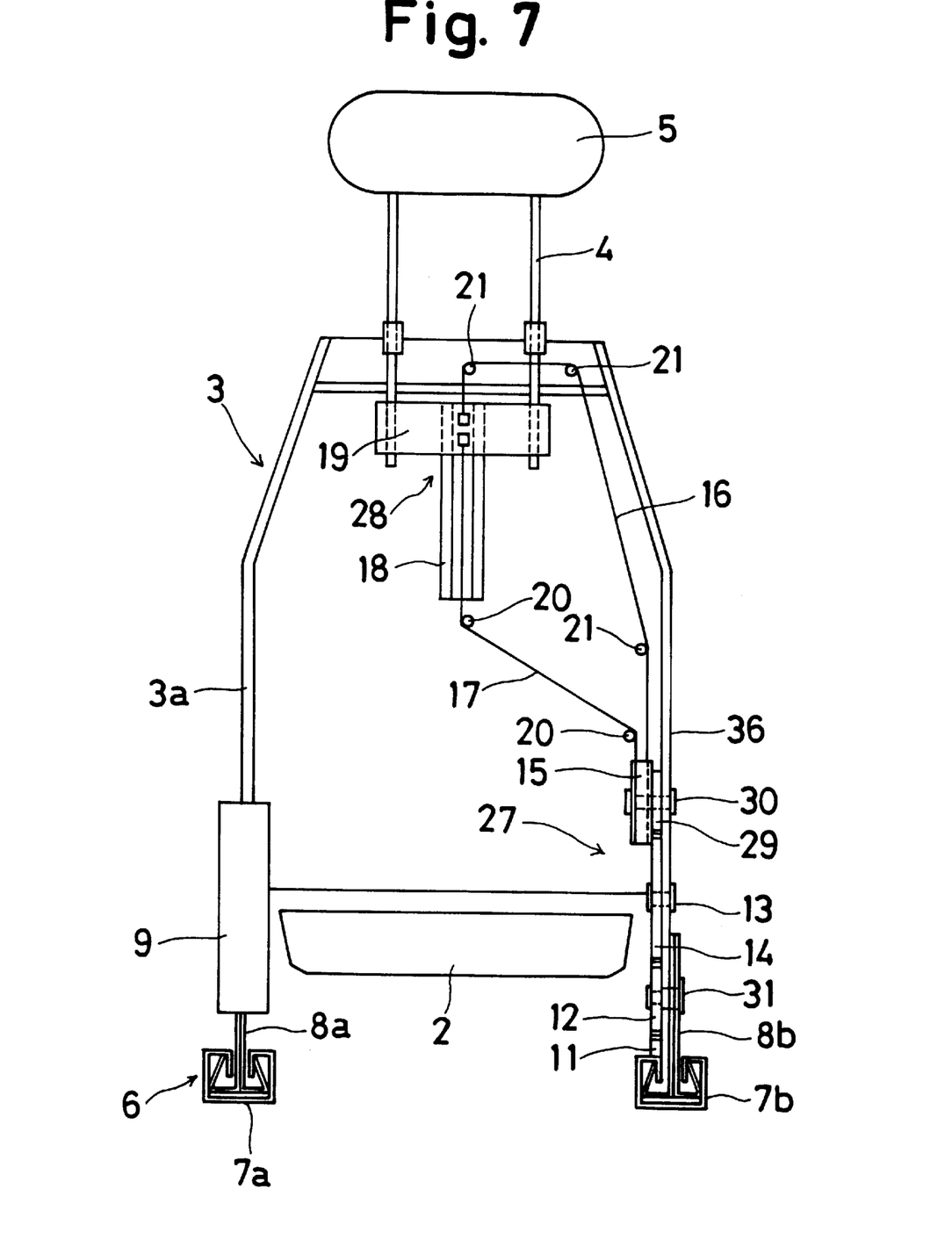
FIG. 7 is a front view of a seat having an adjusting mechanism for adjusting the height of a head rest constructed in accordance with the second embodiment of the present invention.
Figure 8:
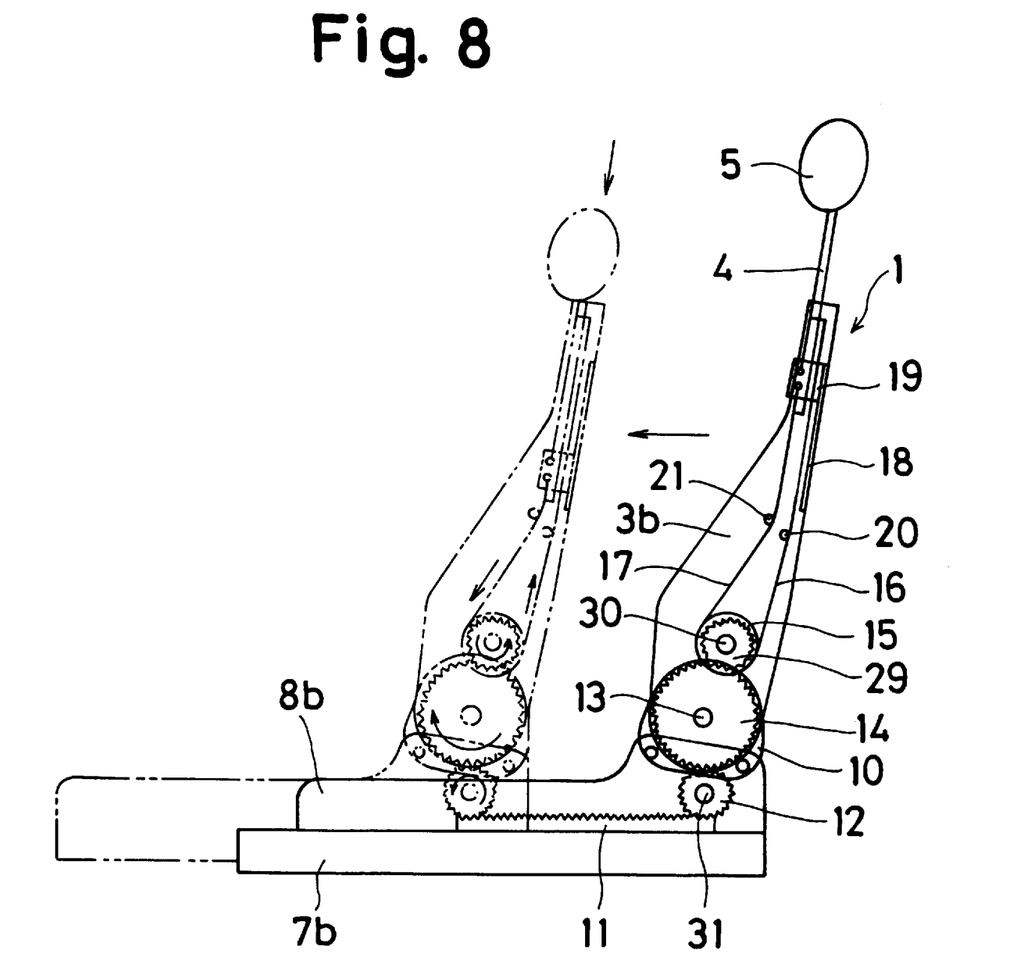
FIG. 8 is a side view showing the operation of the second embodiment of the seat shown in FIG. 7.
Figure 9:
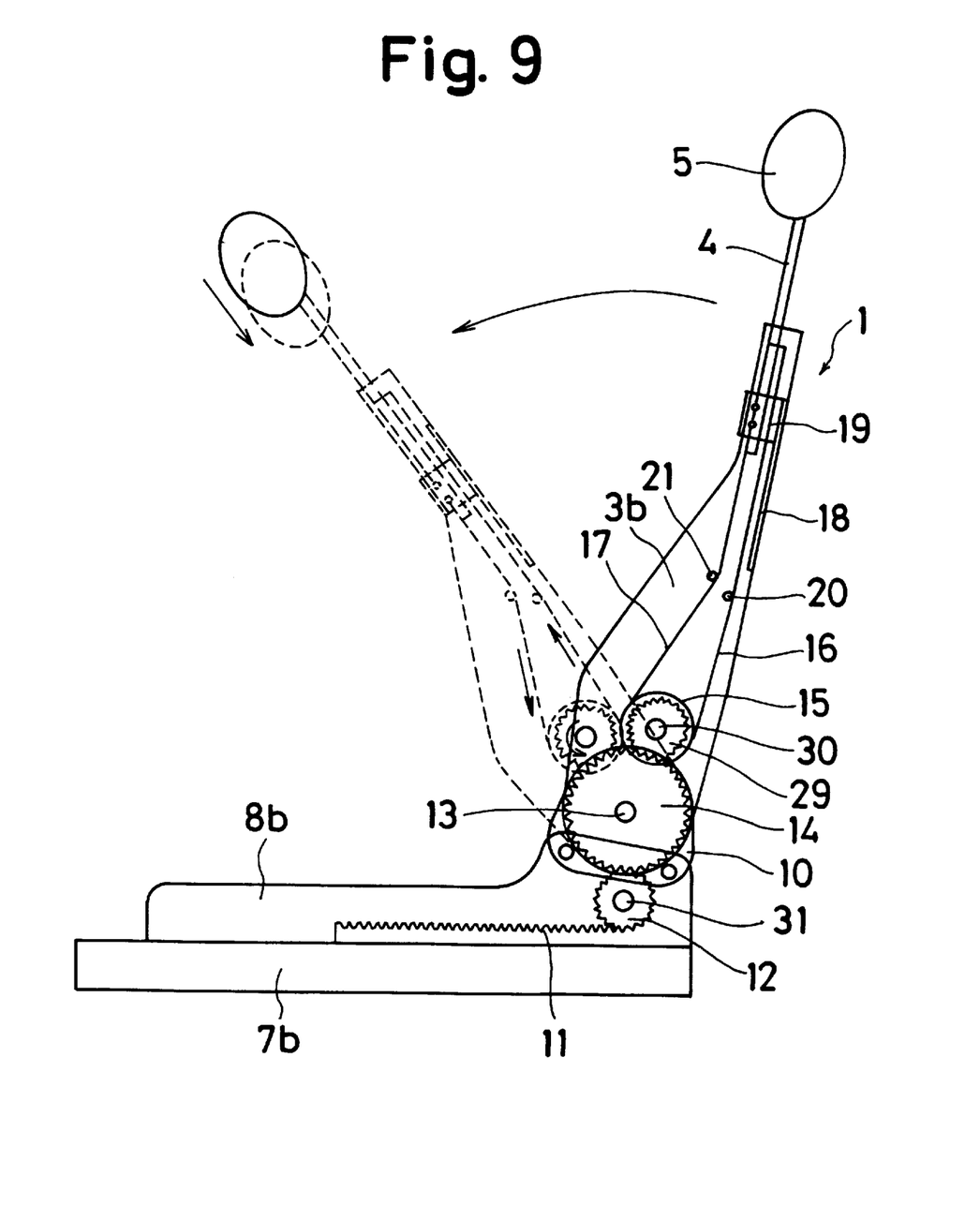
FIG. 9 is a side view showing the operation of the seat shown in FIG. 8 when the seat back is inclined or pivoted in the forward direction relative to the seat cushions

As shown in FIGS. 7 to 9, a second gear 29 is rotatably mounted on the post portion 3b through a pin 30. The second gear 29 is meshed with the first gear 14 mounted on rotation shaft 13. Further, the drum 15 is also mounted on the pin 30 so as to be rotated with the second gear 29.

As shown in FIG. 8, when the upper rails 8a, 8b are caused to slide in the front direction relative to the lower rails 7a, 7b in order to move the seat 1 in the front direction by a manual operation, an electric motor, etc., the pinion gear 12 is moved forwardly relative to the rack gear 11 (as shown in FIG. 8 by a broken line) so as to rotate the first gear 14 and thus the second gear 29 by the pinion gear 12.

Therefore, the drum 15 is rotated by the first gear 14 so that the wire 16 is let out by the drum 15 and the wire 17 is wound by the drum 15. Consequently, the moving member 19 is caused to slide in the downward direction along the guide rail 18 in order to lower the head rest 5 and stays 4 as shown in FIG. 8 by the broken lines in the left showing. When the upper rails 8a, 8b are now slid in the rear direction relative to the lower rails 7a, 7b in order to move the seat 1 in the rearward direction, the pinion gear 12, the first gear 14, the second gear 29, and the drum 15 are rotated in the opposite direction relative to that of the above description. The wire 17 is let out by the drum 15 and the wire 16 is wound by the drum 15. Consequently, the moving member 19 slides in an upward direction along the guide rail 18 to raise the head rest 5 and the stays 4. As described, the head rest 5 is vertically moved according to the direction of longitudinal sliding movement of the seat 1.

As shown in FIG. 9, when the seat back 3A is inclined in the front direction (from the original position shown to a position shown by the dotted lines) by the operation of the reclining unit 9 (FIG. 7), the second gear 29 revolves around the first gear 14 corresponding to the angle of inclination of the seat back frame 3 because the first gear 14 does not rotate. Therefore, as the second gear 29 rotates on the first gear 14, drum 15 rotates together with it. Consequently, the wire 17 is wound by the drum 15 and the wire 16 is let out by the drum 15 so as to lower the head rest 5 to a height corresponding to the angle by which the seat back 3A is inclined relative to the seat cushion 2A.

In both embodiments, the movement of the head rest is interlocked with the inclining mechanism for inclining the seat back relative to the seat cushion and with the sliding mechanism for sliding the seat cushion relative to the floor.

A continual wire may be applied to the first and second embodiment of the invention instead of the wires 16, 17. Further, the knob may be applied to the second embodiment so as to vertically move the head rest apart from the sliding movement of the seat.

While the invention has been particularly shown and described with reference to the preferred embodiments thereof, it will be understood by those skilled in the art that other changes and modifications can be made without departing from the spirit and scope of the invention as set forth in the appended claims and their equivalents.

What is claimed is:

1. A seat including a head rest whose height is adjustable, comprising:

a seat cushion designed to be slidably disposed on a floor;

a seat back connected to the seat cushion and rotatable relative to the seat cushion;

the head rest disposed adjacent the top of the seat back and adjustable in height relative to the seat back;

an inclining mechanism for inclining the seat back relative to the seat cushion;

a sliding mechanism for sliding the seat cushion relative to the floor;

a moving mechanism for moving the head rest towards and away from the top of the seat back; and an interlocking mechanism for interlocking the moving mechanism for moving the head rest with each of the inclining mechanism for inclining the seat back relative to the seat cushion and the sliding mechanism for sliding the seat cushion relative to the floor such that said sliding of the seat cushion or inclining of the seat back results in movement of the headrest in height relative to the seat back.

2. A seat device, comprising:

an inclining mechanism for inclining a seat back relative to a seat cushion;

a sliding mechanism for sliding the seat cushion relative to a floor;

a moving mechanism for moving a head rest in the vertical direction; and an interlock mechanism for interlocking the moving mechanism for moving a head rest in the vertical direction with each of the inclining mechanism for inclining a seat back relative to a seat cushion and the sliding mechanism for sliding the seat cushion relative to a floor such that said sliding of the seat cushion or inclining of the seat back results in movement of the headrest in height relative to the seat back.

3. A seat device as claim in claim 2 wherein the interlock mechanism includes:

a pinion gear for meshing with a rack gear to be mounted on the floor;

a first gear and drum, the first gear meshed with the pinion gear; and at least one wire wound on the drum and connected to the moving mechanism.

4. A seat device as claimed in claim 3 wherein the first gear and drum are mounted on the same shaft.

5. A seat device as claimed in claim 3 wherein the first gear and drum are mounted on separate shafts, and said drum includes a second gear meshed with the first gear.

6. A seat for mounting in a vehicle, comprising:

a seat cushion designed to be slidably mounted in the vehicle for sliding movement;

a seat back connected for rotating movement relative to the seat cushion;

a head rest mounted in the seat back and whose height is adjustable relative to the seat back;

a handle rotatably disposed on the seat;

means connected to the head rest for adjusting the height of the head rest;

an interlock mechanism responsive separately to sliding movement of the seat cushion, rotating movement of the seat cushion, and rotation of the handle to operate the adjusting means to adjust the height of the head rest.

7. A seat as claimed in claim 6 further comprising means for rotating the seat back relative to the seat cushion.

8. A seat as claimed in claim 6 wherein the interlock mechanism includes:

a pinion gear for meshing with a rack gear;

a first gear and drum mounted on the same shaft, the first gear meshed with the pinion gear; and at least one wire wound on the drum and connected to the adjusting means.

9. A seat as claimed in claim 8 wherein the handle is connected to the same shaft as the first gear and drum.

10. A seat as claimed in claim 6 wherein the interlock mechanism includes:

a pinion gear for meshing with a rack gear;

a first gear meshed with the pinion gear;

a drum including a second gear, the second gear meshed with the first gear; and at least one wire wound on the drum and connected to the adjusting means.

* * * * *